UNITED STATES PATENT OFFICE.

MAXIMILIAN CARL LUDWIG ALTHAUSSE, OF BILLWÄRDER-AN-DER-BILLE, NEAR HAMBURG, GERMANY, ASSIGNOR TO FABRIK CHEMISCHER PRÄPARATE VON DR. RICHARD STHAMER, OF HAMBURG, GERMANY, A FIRM.

CELLULOSE LAKES AND PROCESS OF MAKING SAME.

SPECIFICATION forming part of Letters Patent No. 692,775, dated February 4, 1902.

Original application filed November 2, 1900, Serial No. 35,286. Divided and this application filed July 30, 1901. Serial No. 70,260. (No specimens.)

*To all whom it may concern:*

Be it known that I, MAXIMILIAN CARL LUDWIG ALTHAUSSE, a subject of the German Emperor, and a resident of Billwärder-an-der-Bille, near Hamburg, in the German Empire, have invented certain new and useful Improvements in the Production of Lakes from Acetyl Derivates of Hydrocellulose, (forming a divisional portion of my pending application filed November 2, 1900, Serial No. 35,286,) of which the following is a specification.

In the specification of my pending application for Letters Patent filed November 2, 1900, Serial No. 35,286, I have described a process of producing acetyl derivates of hydrocellulose obtained by reacting upon cellulose with chlorinated glacial acetic acid while being heated to a non-oxidizing temperature, which latter process is described in the specification of my prior United States patent, No. 679,204. Such acetyl derivates of hydrocellulose are soluble in alcohol and acetone, but cannot be precipitated by water from such alcoholic or acetonic solutions. It is, however, possible to separate the entire amount of such acetyl derivates of hydrocellulose, even if said solutions are diluted with water to a considerable extent, by adding a small amount of common salt to the said solution. This behavior of the acetyl derivates of hydrocellulose is of the utmost importance, inasmuch as it renders the acetyl derivates of hydrocellulose specially adapted for the production of splendid coloring substances or coloring-pastes, which latter, moreover, possess the advantage of being absolutely insoluble in water after drying. For producing such coloring substance or paste it is sufficient to dye an alcoholic or acetonic solution of an acetyl derivate of hydrocellulose with a suitable dye or coloring-matter, to dilute this mixture with water, and, finally, to separate from the diluted mixture the coloring-paste by adding a small quantity of finely-pulverized common salt to the said diluted mixture or by evaporating the latter.

The analin colors or dyes are best suited to the production of coloring-pastes of exceedingly beautiful and vivid colors, said colors or dyes being added to the solution of acetyl derivates of hydrocellulose in the form of an aqueous or alcoholic solution; but well-colored pastes or coloring substances result also from the addition of extracts of dye-woods, cochineal, crocus, &c.

According to this invention, for example, a carmine coloring-paste may be obtained, as follows: To a concentrated solution of an acetyl derivate of hydrocellulose so much of an alcoholic solution of saffranin G. is added that the mixture shows the tint desired. This mixture is then diluted by the equal volume of water, and, finally, from the thus-diluted mixture the compound of saffranin G. and acetyl derivate of hydrocellulose is salted out in the form of a carmine coloring-paste by adding finely-pulverized common salt. With the same good result I may dispense with the diluting of the colored mixture and salt out the carmine coloring-paste directly from the colored solution or mixture of acetyl derivate of hydrocellulose by adding a concentrated solution of common salt.

As acetyl derivative of hydrocellulose in a humid or moist state is very voluminous, a copious precipitate can be obtained even from a highly-diluted solution. The coloring-pastes thus obtained possess, in contradistinction to the lakes precipitated by means of metallic salts, the advantage of being absolutely insoluble in water after drying, of being transparent or nearly transparent when applied in a thin layer, and of showing a fresh sparkling color.

The property of the acetyl derivatives of hydrocellulose to produce, in combination with coloring-matters, insoluble coloring-pastes gives the said derivatives a high value as dyes or for printing fabrics, such as cloth, or for color-printing on paper.

When fabrics are first treated with an alcoholic or aqueous alcoholic solution of the acetyl derivates of hydrocellulose above described and are then treated with a suitable coloring-matter or dye, a better diffusion or distribution of the color on the fibers is obtained and the fibers retain the color more firmly.

Having thus described my invention, what

I claim as new, and desire to secure by Letters Patent, is—

1. The process of producing coloring-matter from acetyl derivatives of hydrocellulose, which consists in combining coloring-matter with a solution of an acetyl derivative of hydrocellulose and separating the resultant product therefrom, for the purpose set forth.

2. The process of producing coloring-matter by means of acetyl derivates of hydrocellulose, which consists in combining a suitable coloring-matter with a solution of an acetyl derivative of hydrocellulose and in separating the coloring-paste from this mixture by salting out with a concentrated solution of common salt, substantially as and for the purpose set forth.

3. The process of producing coloring-matter by means of acetyl derivates of hydrocellulose, which consists in combining a suitable coloring-matter with a solution of an acetyl derivate of hydrocellulose, diluting this mixture and separating the coloring-matter therefrom, substantially as and for the purpose set forth.

4. The process of producing coloring-matter by means of acetyl derivates of hydrocellulose, which consists in combining a suitable coloring-matter with a solution of an acetyl derivate of hydrocellulose, diluting this mixture and salting out the coloring-matter by means of pulverized common salt, substantially as and for the purpose set forth.

5. As a new article of manufacture, the herein-described coloring-paste, which consists of an acetyl derivate of hydrocellulose combined with a suitable coloring-matter, said coloring matter or paste being absolutely insoluble in water after drying and being substantially transparent when applied in a thin layer, substantially as set forth.

MAXIMILIAN CARL LUDWIG ALTHAUSSE.

Witnesses:
MAX LEMCKE,
T. CHRIST HAFERMANN.